(12) United States Patent
Soucy et al.

(10) Patent No.: US 8,903,656 B2
(45) Date of Patent: *Dec. 2, 2014

(54) SYNCHRONIZATION OF THE POSITION AND ORIENTATION OF A 3D MEASUREMENT DEVICE AND THE POSITION AND ORIENTATION OF AN INTELLIGENT GUIDANCE DEVICE

(75) Inventors: Marc Soucy, Quebec (CA); Hans-Peter Duwe, Lindau (DE)

(73) Assignee: Innovmetric Logiciels Inc., Quebec (CA)

( * ) Notice: Subject to any disclaimer, the term of this patent is extended or adjusted under 35 U.S.C. 154(b) by 163 days.

This patent is subject to a terminal disclaimer.

(21) Appl. No.: 13/176,475

(22) Filed: Jul. 5, 2011

(65) Prior Publication Data

US 2013/0013201 A1    Jan. 10, 2013

(51) Int. Cl.
*G01C 21/20* (2006.01)
*H04N 15/00* (2006.01)
*G06F 15/00* (2006.01)
*G06T 15/00* (2011.01)

(52) U.S. Cl.
CPC ....................................... *G01C 21/20* (2013.01)
USPC .............. 701/520; 348/51; 702/153; 345/419

(58) Field of Classification Search
CPC ........ G01C 21/20; H04N 15/00; G06F 15/00; G06T 15/00
USPC .............. 701/520; 348/51; 702/153; 345/419
See application file for complete search history.

(56) References Cited

U.S. PATENT DOCUMENTS

| | | | |
|---|---|---|---|
| 6,083,353 A * | 7/2000 | Alexander, Jr. ................ | 202/158 |
| 6,235,895 B1 * | 5/2001 | McEwan et al. .............. | 540/145 |
| 6,992,583 B2 * | 1/2006 | Muramatsu .............. | 340/539.32 |
| 7,003,386 B1 * | 2/2006 | Ericsson et al. ................ | 701/50 |
| 2004/0051680 A1 | 3/2004 | Azuma et al. | |
| 2008/0122785 A1 * | 5/2008 | Harmon ........................ | 345/156 |
| 2009/0195497 A1 * | 8/2009 | Fitzgerald et al. ............ | 345/156 |
| 2011/0054689 A1 * | 3/2011 | Nielsen et al. ................ | 700/258 |

FOREIGN PATENT DOCUMENTS

WO    WO 98/10246 A1    3/1998

OTHER PUBLICATIONS

European Search Report issued on Nov. 7, 2011 for corresponding European Patent Application No. EP 11172778.

* cited by examiner

*Primary Examiner* — Fadey Jabr
*Assistant Examiner* — Yazan A Soofi
(74) *Attorney, Agent, or Firm* — Wolf, Greenfield & Sacks, P.C.

(57) ABSTRACT

There is described herein a method to synchronize the position and orientation of an IGD 3D Coordinate System with the position and orientation of a 3DM 3D Coordinate System, in which the IGD's gravity direction measurement device and electronic compass are used explicitly. There is also described a method for maintaining the synchronization while the IGD is moving, in which the IGD's three-axis accelerometer is used explicitly. There is further described how an IGD, once its position and orientation have been synchronized to the position and orientation of a 3DM, can be used to display 3D graphics that guide the measurement process.

20 Claims, 9 Drawing Sheets

SYNCHRONIZATION OF THE POSITION AND ORIENTATION OF A 3D MEASUREMENT DEVICE AND THE POSITION AND ORIENTATION OF AN INTELLIGENT GUIDANCE DEVICE

CROSS-REFERENCE TO RELATED APPLICATIONS

This is the first application filed for the present invention.

TECHNICAL FIELD

The present invention relates to the field of the use of Intelligent Guidance Devices (IGD) for guiding measurement processes using 3D graphics.

BACKGROUND

A 3D Measurement Device (3DM) is a measurement system capable of measuring the (x, y, z) coordinates of points on physical parts in the 3-dimensional space, using anyone of many known measurement principles. These devices are used in many different manufacturing industries for quality assurance procedures.

In some instances, the devices are made to be portable such that they may be easier to handle and manipulate. However, since they have their own coordinate system, they are not necessarily compatible with other existing technologies. Images or measurements taken with these devices cannot easily be transferred to other imaging devices without losing some information attached to the coordinate system.

Therefore, there is a need to adapt 3D measurement devices to be used with other technologies.

SUMMARY

There is described herein a method to synchronize the position and orientation of an IGD 3D Coordinate System with the position and orientation of a 3DM 3D Coordinate System, in which the IGD's gravity direction measurement device and electronic compass are used explicitly. There is also described a method for maintaining the synchronization while the IGD is moving, in which the IGD's three-axis accelerometer is used explicitly. There is further described how an IGD, once its position and orientation have been synchronized to the position and orientation of a 3DM, can be used to display 3D graphics that guide the measurement process.

In accordance with a first broad aspect, there is provided a method for synchronizing a three-dimensional measurement device (3DM) having a 3DM internal 3D coordinate system $O_{3DM}$, $X_{3DM}$, $Y_{3DM}$, and $Z_{3DM}$, with an intelligent guidance device (IGD) having a display device, a gravity direction measurement device, an electronic compass, and an IGD internal 3D coordinate system $O_{IGD}$, $X_{IGD}$, $Y_{IGD}$, $Z_{IGD}$, the method comprising: determining coordinates $RPX_{IGD}$, $RPY_{IGD}$, $RPZ_{IGD}$ of a reference point RP in the IGD internal 3D coordinate system $O_{IGD}$, $X_{IGD}$, $Y_{IGD}$, $Z_{IGD}$; defining a coordinate system $O_{Earth}$, $X_{IGD-Earth}$, $Y_{IGD-Earth}$, $Z_{IGD-Earth}$ using a direction opposite to gravity as $Z_{IGD-Earth}$ and a direction corresponding to a magnetic north pole as $Y_{IGD-Earth}$, from a perspective of the IGD; computing and applying a rigid transformation $T_{IGD-To-IGDEarth}$ to transform axes $X_{IGD}$, $Y_{IGD}$, $Z_{IGD}$ of the IGD internal 3D coordinate system to $X_{IGD-Earth}$, $Y_{IGD-Earth}$, $Z_{IGD-Earth}$ and the reference point RP having the coordinates $RPX_{IGD}$, $RPY_{IGD}$, $RPZ_{IGD}$ to $O_{Earth}$; determining coordinates $RPX_{3DM}$, $RPY_{3DM}$, $RPZ_{3DM}$ of the reference point RP in the 3DM internal 3D coordinate system $O_{3DM}$, $X_{3DM}$, $Y_{3DM}$, and $Z_{3DM}$; defining a coordinate system $O_{Earth}$, $X_{3DM-Earth}$, $Y_{3DM-Earth}$, $Z_{3DM-Earth}$ using a direction opposite to gravity as $Z_{3DM-Earth}$ and the direction corresponding to the magnetic north pole as $Y_{3DM-Earth}$, from a perspective of the 3DM; and computing and applying a rigid transformation $T_{3DM-To-3DMEarth}$ to transform axes $X_{3DM}$, $Y_{3DM}$, and $Z_{3DM}$ of the 3DM internal 3D coordinate system to axes $X_{3DM-Earth}$, $Y_{3DM-Earth}$, $Z_{3DM-Earth}$ and the reference point RP having the coordinates $RPX_{3DM}$, $RPY_{3DM}$, $RPZ_{3DM}$ to $O_{Earth}$.

In accordance with a second broad aspect, there is provided a system for synchronizing a three-dimensional measurement device (3DM) having a 3DM internal 3D coordinate system $O_{3DM}$, $X_{3DM}$, $Y_{3DM}$, and $Z_{3DM}$, with an intelligent guidance device (IGD) having a display device, a gravity direction measurement device, an electronic compass, and an IGD internal 3D coordinate system $O_{IGD}$, $X_{IGD}$, $Y_{IGD}$, $Z_{IGD}$, the system comprising: an IGD transformation module operatively connected to the IGD and adapted to define a coordinate system $O_{Earth}$, $X_{IGD-Earth}$, $Y_{IGD-Earth}$, $Z_{IGD-Earth}$ using a direction opposite to gravity as $Z_{IGD-Earth}$ and a direction corresponding to a magnetic north pole as $Y_{IGD-Earth}$, from a perspective of the IGD, and compute and apply a rigid transformation $T_{IGD-To-IGDEarth}$ to transform axes $X_{IGD}$, $Y_{IGD}$, $Z_{IGD}$ of the IGD internal 3D coordinate system to axes $X_{IGD-Earth}$, $Y_{IGD-Earth}$, $Z_{IGD-Earth}$ and a reference point RP having coordinates $RPX_{IGD}$, $RPY_{IGD}$, $RPZ_{IGD}$ in the IGD internal 3D coordinate system to $O_{Earth}$; and a 3DM transformation module operatively connected to the 3DM and adapted to define a coordinate system $O_{Earth}$, $X_{3DM-Earth}$, $Y_{3DM-Earth}$, $Z_{3DM-Earth}$ using a direction opposite to gravity as $Z_{3DM-Earth}$ and the direction corresponding to the magnetic north pole as $Y_{3DM-Earth}$, from a perspective of the 3DM, compute and apply a rigid transformation $T_{3DM-To-3DMEarth}$ to transform axes $X_{3DM}$, $Y_{3DM}$, and $Z_{3DM}$ of the 3DM internal 3D coordinate system to axes $X_{3DM-Earth}$, $Y_{3DM-Earth}$, $Z_{3DM-Earth}$ and the reference point RP having coordinates $RPX_{3DM}$, $RPY_{3DM}$, $RPZ_{3DM}$ in the 3DM internal 3D coordinate system to $O_{Earth}$.

In accordance with another broad aspect, there is provided an intelligent guidance device (IGD) having an IGD internal 3D coordinate system $O_{IGD}$, $X_{IGD}$, $Y_{IGD}$, $Z_{IGD}$, the device comprising: a gravity direction measurement device; an electronic compass; an IGD transformation module operatively connected to the IGD and adapted to define a coordinate system $O_{Earth}$, $X_{IGD-Earth}$, $Y_{IGD-Earth}$, $Z_{IGD-Earth}$ using a direction opposite to gravity as $Z_{IGD-Earth}$ and a direction corresponding to a magnetic north pole as $Y_{IGD-Earth}$, and to compute and apply a rigid transformation $T_{IGD-To-IGDEarth}$ to transform axes $X_{IGD}$, $Y_{IGD}$, $Z_{IGD}$ of the IGD internal 3D coordinate system to axes $X_{IGD-Earth}$, $Y_{IGD-Earth}$, $Z_{IGD-Earth}$ and a reference point RP having coordinates $RPX_{IGD}$, $RPY_{IGD}$, $RPZ_{IGD}$ in the IGD internal 3D coordinate system to $O_{Earth}$; and a display device for displaying 3D graphics in a 3D coordinate system synchronized with a 3D coordinate system of a three-dimensional measurement device.

In accordance with a further broad aspect, there is provided at least one computer program product for synchronizing a three-dimensional measurement device (3DM) having a 3DM internal 3D coordinate system $O_{3DM}$, $X_{3DM}$, $Y_{3DM}$, and $Z_{3DM}$, with an intelligent guidance device (IGD) having a display device, a gravity direction measurement device, an electronic compass, and an IGD internal 3D coordinate system $O_{IGD}$, $X_{IGD}$, $Y_{IGD}$, $Z_{IGD}$, comprising instruction means encoded on a computer-readable medium, for causing operations of: defining a coordinate system $O_{Earth}$, $X_{IGD-Earth}$, $Y_{IGD-Earth}$, $Z_{IGD-Earth}$ using a direction opposite to gravity as $Z_{IGD-Earth}$ and a direction corresponding to a magnetic north pole as $Y_{IGD-Earth}$, from a perspective of the IGD; computing and applying a rigid transformation $T_{IGD-To-IGDEarth}$ to transform axes $X_{IGD}$, $Y_{IGD}$, $Z_{IGD}$ of the IGD internal 3D coordinate system to axes $X_{IGD-Earth}$, $Y_{IGD-Earth}$, $Z_{IGD-Earth}$ and a reference point RP having coordinates $RPX_{IGD}$, $RPY_{IGD}$, $RPY_{IGD}$ in the IGD internal 3D coordinate system to $O_{Earth}$; defining a coordinate system $O_{Earth}$, $X_{3DM-Earth}$, $Y_{3DM-Earth}$, $Z_{3DM-Earth}$ using a direction opposite to gravity as $Z_{3DM-Earth}$ and the direction corresponding to the magnetic north pole as $Y_{3DM-Earth}$, from a perspective of the 3DM; and computing and applying a rigid transformation $T_{3DM-To-3DMEarth}$ to transform axes $X_{3DM}$, $Y_{3DM}$, and $Z_{3DM}$ of the 3DM internal 3D coordinate system to the axes $X_{3DM-Earth}$, $Y_{3DM-Earth}$, $Z_{3DM-Earth}$ and the reference point RP having coordinates $RPX_{3DM}$, $RPY_{3DM}$, $RPZ_{3DM}$ in the 3DM internal 3D coordinate system to $O_{Earth}$.

In the present specification, the following definitions are to be used throughout.

3D Coordinate System: A system for assigning 3 numbers to each point in a 3-dimensional space. A common instance of a 3D Coordinate System is the Cartesian coordinate system where three X, Y, Z axes perpendicular to each other and meeting each other at an origin point (0, 0, 0) are used to parameterize the 3-dimensional space (see FIG. 1). An infinite number of 3D Coordinate Systems can be derived from the basic Cartesian coordinate system by moving (or translating) the origin point in 3-dimensional space, defining a new origin O', and rotating the original X, Y, Z axes to define new axes X', Y', and Z' (see FIG. 2). In such a case, the X', Y', and Z' axes can each be expressed by using a triplet of (x, y, z) coordinates, expressed in the Cartesian coordinate system. The triplet of (x, y, z) coordinates representing a particular axis is computed by determining a point P located at a distance of 1 from the origin O' along the direction of the axis, and then subtracting the origin O' from this point P.

A 3D Coordinate System is said to be right-handed if the vector product between the first axis (for example X) and the second axis (for example Y) produces the third axis (for example Z). A 3D Coordinate System would be left-handed if the vector product between the second axis and the first axis would produce the third axis. This document uses right-handed 3D Coordinate Systems in all explanations. However, left-handed 3D Coordinate Systems could be used as well without loss of generality.

3D Transformation: A mathematical operation that transforms any input point $(x_i, y_i, z_i)$ in 3-dimensional space into an output point $(x_o, y_o, z_o)$.

Rigid 3D Transformation: Rigid 3D Transformations are subsets of the possible 3D Transformations applicable to input points by which only rotations and translations are applied to these points. Such a 3D Transformation is called rigid because it preserves the original shape and dimensions of any 3-dimensional object. For example, let's imagine a box having a width of 1 meter, a height of 2 meters, and a depth of 3 meters. Then, let's consider any possible Rigid 3D Transformation that can be applied to this box. If any of these possible Rigid 3D Transformations are applied to the box, the box dimensions would always remain 1 meter by 2 meters by 3 meters under all circumstances.

A Rigid 3D Transformation RT can be expressed by six numbers $(r_x, r_y, r_z, t_x, t_y, t_z)$. The numbers $r_x$, $r_y$, and $r_z$ represent successive rotations to be applied about the X, Y, and Z axes of the Cartesian coordinate system. The numbers $t_x$, $t_y$, and $t_z$ represent successive translations to be applied along the X, Y, and Z axes of the Cartesian coordinate system. There are various mathematical techniques available to represent Rigid 3D Transformation using 4 by 4 matrices and to extract the three rotations and three translations from a 4 by 4 Rigid 3D Transformation matrix.

In addition to being applicable to points, Rigid 3D Transformations can also be applied to 3D Coordinate Systems. Four points are needed to define an arbitrary 3D Coordinate System: the origin O', and the points at a unitary distance of 1 from O' along the X', Y', and Z' axes. A Rigid 3D Transformation is applied to a 3D Coordinate System by transforming the four points that are needed to describe it. The origin and three axes of the transformed 3D Coordinate System may then be rebuilt from the four transformed points by subtracting the transformed origin from the three transformed points at the extremity of the unitary axes (see FIG. 3).

Gravity Direction Measurement Device: A measurement device that is capable of measuring the direction of gravity, such as a three-axis inclinometer. Gravity direction measurement devices can be incorporated in computing devices. The gravitational force generally points towards the center of Earth with a relatively stable intensity locally.

Electronic Compass: A measurement device that can determine the direction of the Earth's North magnetic pole. An electronic compass can be incorporated in computing devices. Locally, the measurements produced by an electronic compass are fairly constant. The North direction can be used not only for geographical navigation purposes, but also as a fixed reference direction to define a coordinate system.

Three-Axis Accelerometer: A measurement device that can determine the acceleration along three axes perpendicular to each other. A three-axis accelerometer can be incorporated in computing devices. By letting a computing device that incorporates a three-axis accelerometer in a stable position for a predetermined period of time such as a few seconds for example, then starting to move it in 3D space, the three-axis accelerometer can be used to determine the speed and relative position of the computing device along the three axes.

Display Device: A material support to visually output information to an end-user, such as text, images, videos, etc. Computing devices are generally equipped with display devices.

Intelligent Guidance Device (IGD): A computing device equipped with a communication unit, a display device, a gravity direction measurement device, and an electronic compass. An IGD may further be provided with a three-axis accelerometer. Examples of an IGD comprise the iPhone™ 3GS model, the iPhone™ 4 model, and the like.

3D Measurement Device (3DM): A measurement system capable of measuring the (x, y, z) coordinates of points on physical parts in the 3-dimensional space. Any measurement principle can be used.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

A 3DM is a device designed to measure the (x, y, z) coordinates of points and report these measured coordinates from the perspective of its internal 3D Coordinate System defined by an origin $O_{3DM}$ and three axes $X_{3DM}$, $Y_{3DM}$, and $Z_{3DM}$. An IGD is a device that also has an internal 3D Coordinate System defined by an origin $O_{IGD}$ and three axes $X_{IGD}$, $Y_{IGD}$, $Z_{IGD}$.

Figure 1:
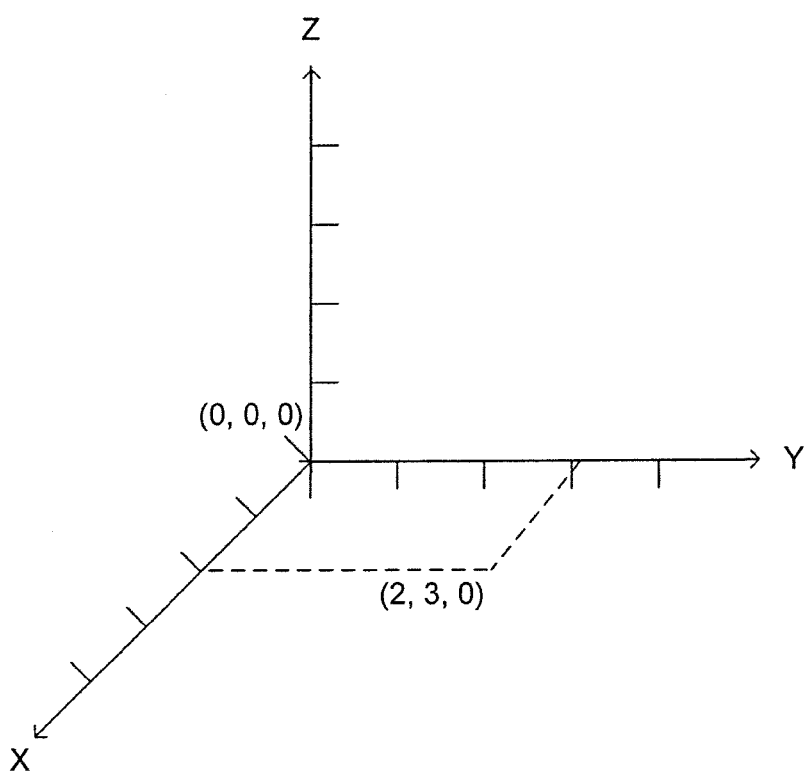
FIG. 1 illustrates a Cartesian coordinate system with a point parametrized in a 3-dimensional space, in accordance with one embodiment.

FIG. 1 illustrates a Cartesian coordinate system having axes X, Y, and Z and an origin (0, 0, 0). A point (2, 3, 0) is parametrized in the 3-dimensional space.

Figure 2:
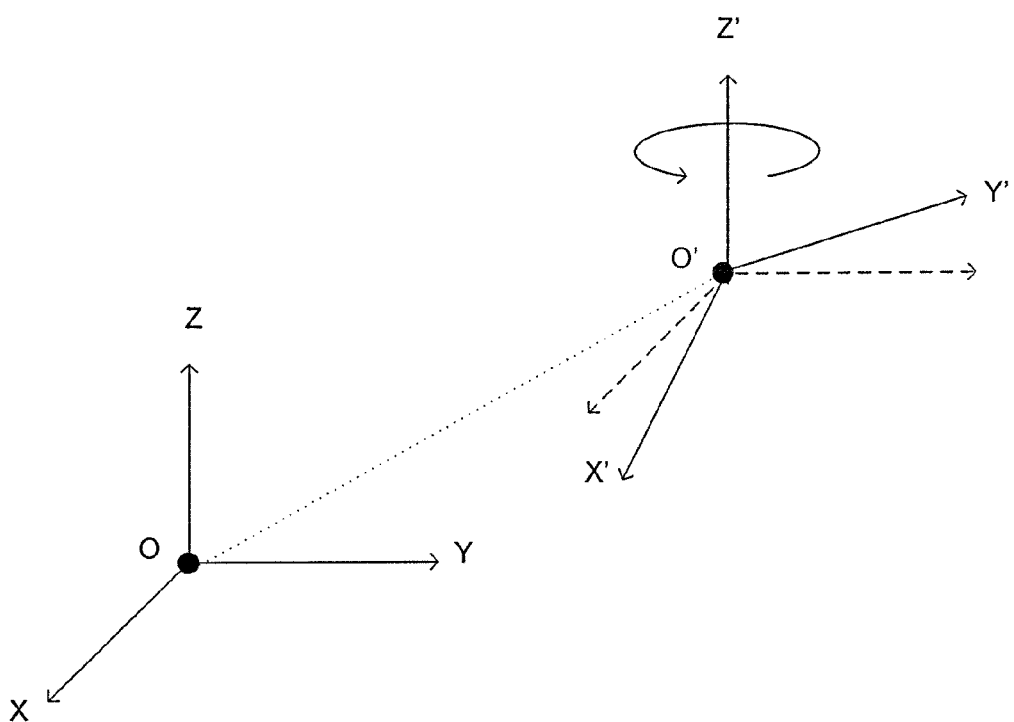
FIG. 2 illustrates the Cartesian coordinate system of FIG. 1 and a second 3D coordinate system defined by translating and rotating the Cartesian coordinate system, in accordance with one embodiment.
Figure 3:
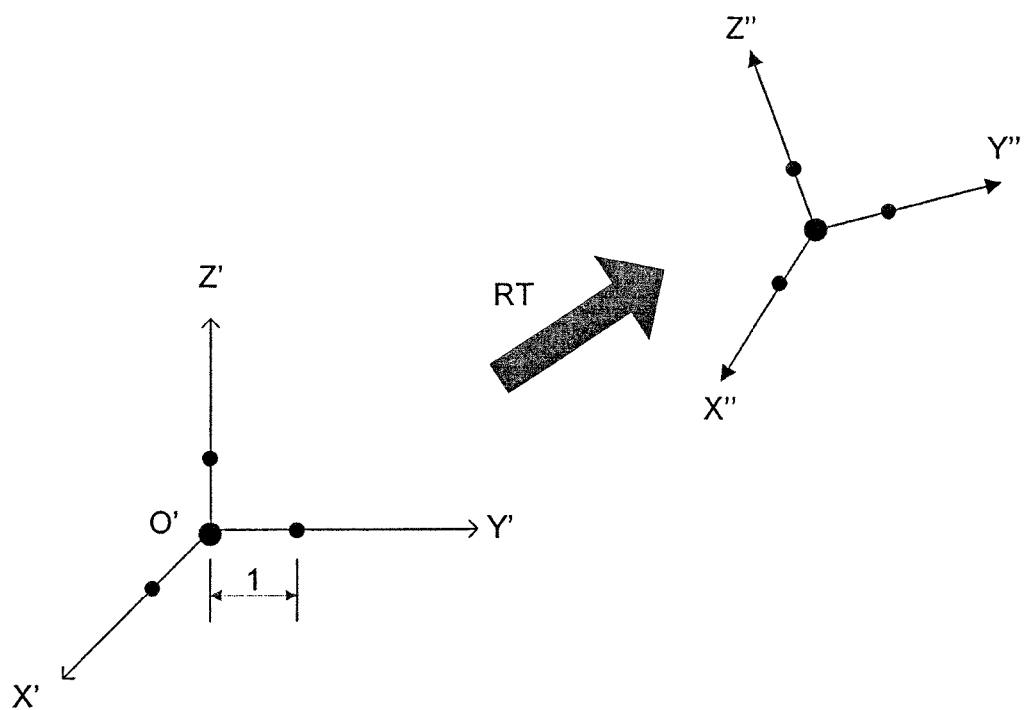
FIG. 3 illustrates how a 3D coordinate system is transformed by a Rigid 3D Transformation, in accordance with one embodiment.

FIG. 2 illustrates a new coordinate system defined by translating and rotating the Cartesian coordinate system of FIG. 1. This new coordinate system has axes X', Y', Z'. In FIG. 3, the coordinate system defined by X', Y', Z' is further transformed by rigid 3D transformation RT by transforming four points and recomputing the axes such that we have X", Y", Z". These principles are used in order to synchronize the position and orientation of a 3DM 3D Coordinate System with the position and orientation of an IGD 3D Coordinate System.

In order to synchronize the position of an IGD 3D Coordinate System with the position of a 3DM 3D Coordinate System, the first step consists in selecting a reference point RP and determining the coordinates $RPX_{IGD}$, $RPY_{IGD}$, $RPZ_{IGD}$ of the reference point RP in the internal coordinate system of the IGD and the coordinates $RPX_{3DM}$, $RPY_{3DM}$, $RPZ_{3DM}$ of the reference point RP in the internal coordinate system of the 3DM. It should be understood that any reference point could be used and any method could be used to determine the reference point coordinates in both IGD or 3DM 3D Coordinate Systems.

For example, the IGD could rest in a stable position and a mark such as a circle or a point for example, could be displayed on the Display Device of the IGD. The coordinates of the point or the circle's center would be determined with respect to the IGD 3D Coordinate System by setting up a coordinate system based on the IGD manufacturer specifications. The 3DM could then be used to measure the displayed circle or point and determine the point or circle's center coordinates in the 3DM 3D Coordinate System.

Once the position of a common reference point, i.e. the reference point RP, has been established in both IGD and 3DM 3D Coordinate Systems, the orientation of the IGD and 3DM 3D Coordinate Systems can be determined. Using the gravity direction measurement device of the IGD, the direction of gravity is measured and a vector $Z_{IGD-Earth}$ pointing in a direction opposite to gravity (up) is determined. Using the electronic compass of the IGD, the direction of the North magnetic pole is measured and a vector $Y_{IGD-Earth}$ pointing in the North direction is determined.

Since the $Z_{IGD-Earth}$ and $Y_{IGD-Earth}$ axes are computed from separate measurement devices, they are not perfectly perpendicular to each other. An adjustment operation is used to make them perpendicular to each other. A plane formed by $Z_{IGD-Earth}$ and $Y_{IGD-Earth}$ is defined. One of the two axes, for example $Z_{IGD-Earth}$, is fixed. The adjusted axis, for example $Y_{IGD-Earth}$, is then rotated in the plane to make it perpendicular to the fixed axis. There are two positive rotation angles below or equal to 180 degrees that make the adjusted axis perpendicular to the fixed axis. The one closest to 0 is used. Alternately, the $Y_{IGD-Earth}$ could be used as the fixed axis, and the $Z_{IGD-Earth}$ axis could be rotated to make it perpendicular to $Y_{IGD-Earth}$ using the same method.

Figure 4A:
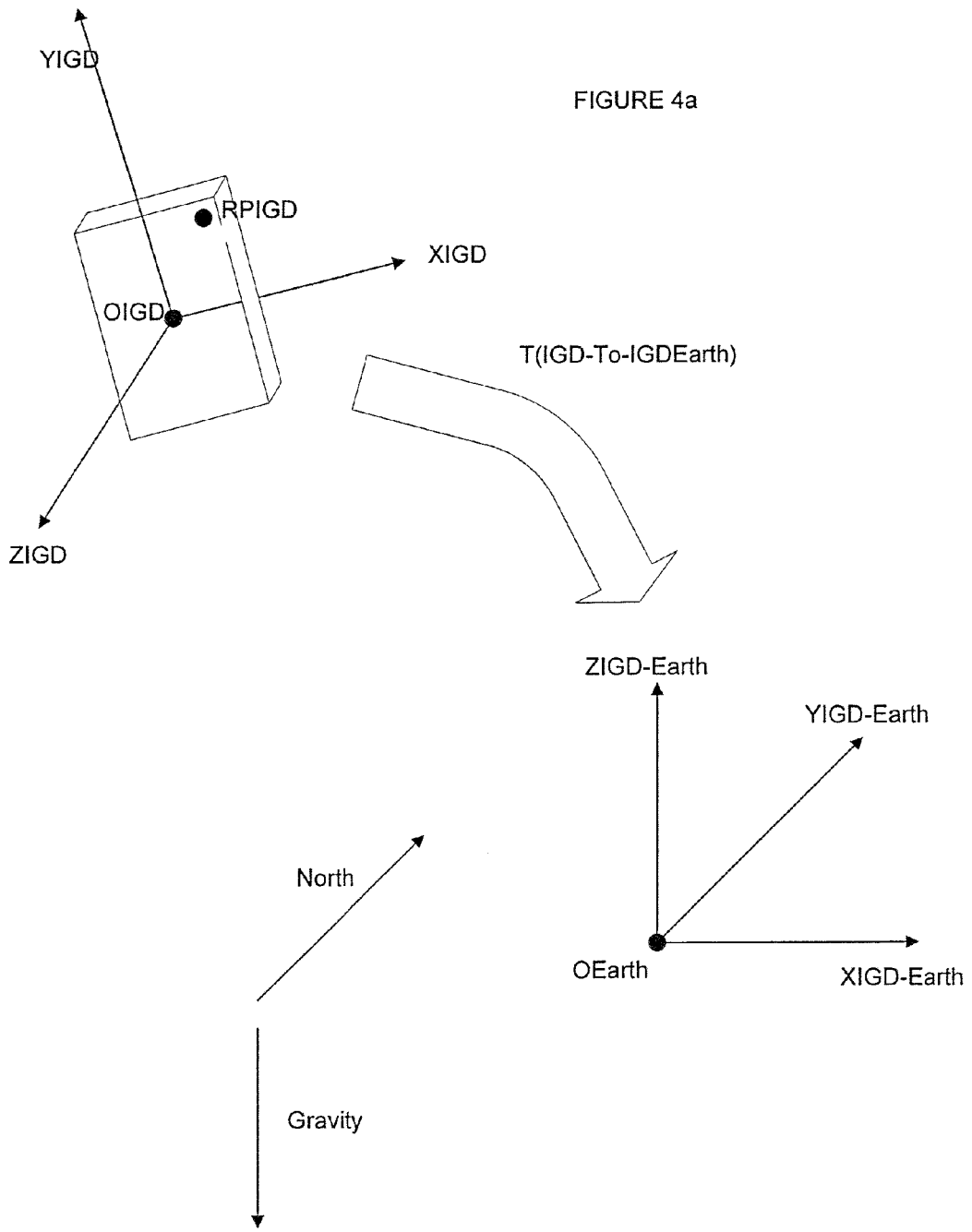
FIG. 4a illustrates an exemplary transformation of an IGD 3D coordinate system to orient it with respect to gravity and the North direction and transform a reference point $RP_{IGD}$ into $O_{Earth}$, in accordance with one embodiment.
Figure 4B:
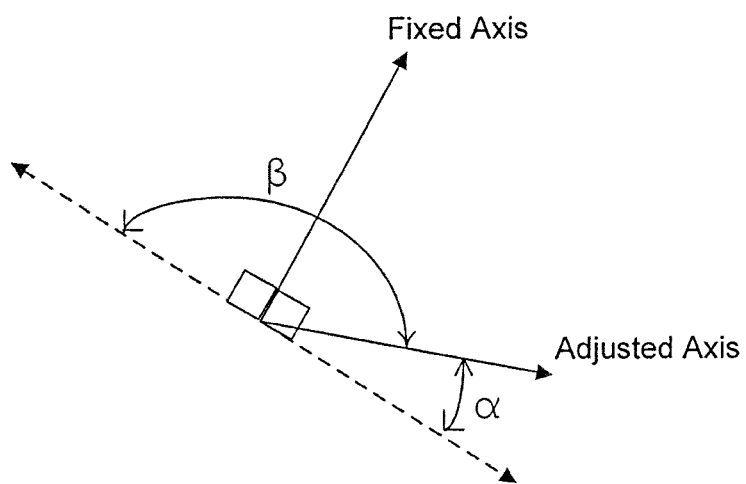
FIG. 4b illustrates the axis adjustment operation, in accordance with one embodiment.

The adjustment operation is illustrated in FIG. 4b. In the plane formed by the fixed axis and the adjusted axis, two positive rotation angles α and β less than or equal to 180° can be applied to the adjusted axis to make it perpendicular to the fixed axis. The smallest of α and β is used.

A vector $X_{IGD-Earth}$ is found by computing the vector product between $Y_{IGD-Earth}$ and $Z_{IGD-Earth}$. An arbitrary origin $O_{Earth}$ is defined at (0, 0, 0). $O_{Earth}$, $X_{IGD-Earth}$, $Y_{IGD-Earth}$, $Z_{IGD-Earth}$ represent a 3D Coordinate System where one of the axes points in a direction opposite to gravity and the other points towards North.

A Rigid 3D Transformation $T_{IGD-To-IGDEarth}$ is computed to both transform the $X_{IGD}$, $Y_{IGD}$, $Z_{IGD}$ axes to the $X_{IGD-Earth}$, $Y_{IGD-Earth}$, $Z_{IGD-Earth}$ axes and transform the reference point ($RPX_{IGD}$, $RPY_{IGD}$, $RPZ_{IGD}$) to the origin $O_{Earth}$, as illustrated in FIG. 4a.

The direction of gravity is measured from the standpoint of the 3DM 3D Coordinate System. Any method known to the person skilled in the art may be used. For example, adjust a flat physical part using a level to bring its flat section perpendicular to gravity, measure the flat section with the 3DM, fit a plane on the measured points, and use the plane's normal vector to determine the direction of gravity. Alternatively, a gravity direction measurement device integrated to the 3DM may be used to determine the direction of gravity.

From the gravity vector measured from the standpoint of the 3DM 3D Coordinate System, a vector $Z_{3DM-Earth}$ pointing in a direction opposite to gravity (up) may be determined. The direction of the North magnetic pole is measured from the standpoint of the 3DM 3D Coordinate System. Any method known to a person skilled in the art may be used. For example, use an electronic compass integrated to the 3DM, display the North direction on the IGD display device and use the 3DM to measure the displayed direction, or use a standard compass and use the 3DM to measure the direction indicated by the standard compass.

From the North direction measured from the standpoint of the 3DM 3D Coordinate System, a vector $Y_{3DM-Earth}$ pointing in the North direction may be determined. A plane formed by $Z_{3DM-Earth}$ and $Y_{3DM-Earth}$ is then defined. If $Y_{3DM-Earth}$ is not perfectly perpendicular to $Z_{3DM-Earth}$, either one of $Z_{3DM-Earth}$ or $Y_{3DM-Earth}$ may be rotated in the plane to bring the two perfectly perpendicular. Two positive rotation angles are possible, the smallest is used.

A vector $X_{3DM-Earth}$ is determined by computing the vector product between $Y_{3DM-Earth}$ and $Z_{3DM-Earth}$. An origin $O_{Earth}$ is defined at (0, 0, 0). $O_{Earth}$, $X_{3DM-Earth}$, $Y_{3DM-Earth}$, $Z_{3DM-Earth}$ represent a 3D Coordinate System where one of the axes points in a direction opposite to gravity and the other points towards North.

Figure 5:
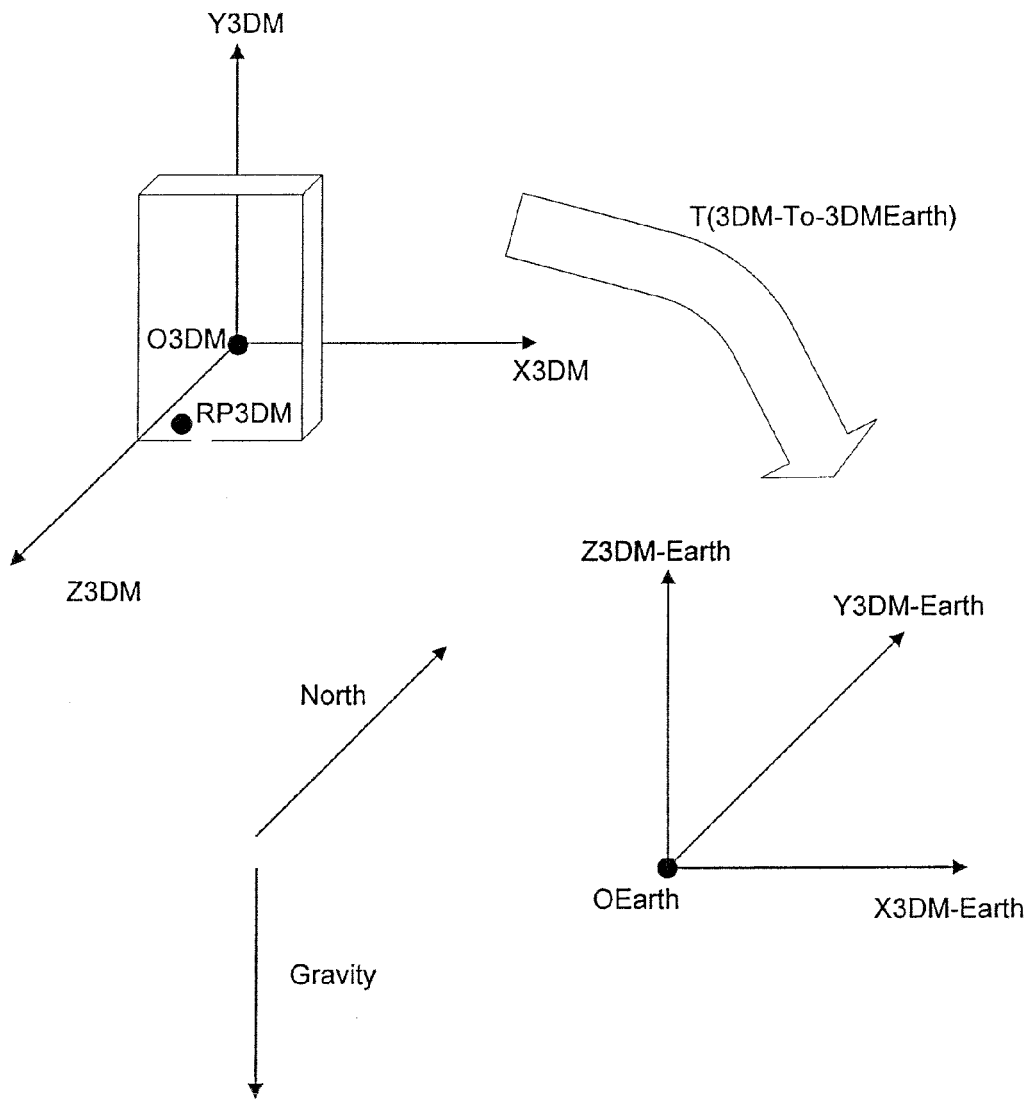
FIG. 5 illustrates an exemplary transformation of a 3DM 3D coordinate system to orient it with respect to gravity and the North direction and transform reference point $RP_{3DM}$ into $O_{Earth}$, in accordance with one embodiment.

A Rigid 3D Transformation $T_{DM-To-3DMEarth}$ is computed to both transform the $X_{3DM}$, $Y_{3DM}$, $Z_{3DM}$ axes of the 3DM coordinate system to the $X_{3DM-Earth}$, $Y_{3DM-Earth}$, $Z_{3DM-Earth}$ axes and transform the reference point ($RPX_{3DM}$, $RPY_{3DM}$, $RPZ_{3DM}$) to the origin $O_{Earth}$, as illustrated in FIG. 5.

The position and orientation of the IGD and the position and orientation of the 3DM are synchronized by transforming the internal 3D Coordinate System of the IGD by Rigid 3D Transformation $T_{IGD-To-IGDEarth}$ and transforming the internal 3D Coordinate System of the 3DM by Rigid 3D Transformation $I_{3DM-To-3DMEarth}$. The position and orientation of the IGD and the position and orientation of the 3DM are synchronized since a reference point RP whose 3D coordinates are known in both IGD and 3DM internal 3D Coordinate Systems has been used to define the origin $O_{Earth}$, the transformed $X_{IGD}$ and $X_{3DM}$ axes are parallel to each other and point in the same direction, the transformed $Y_{IGD}$ and $Y_{3DM}$ axes are parallel to each other and point in the same direction, and the transformed $Z_{IGD}$ and $Z_{3DM}$ axes are parallel to each other and point in the same direction.

Once the position and orientation of the IGD and the position and orientation of the 3DM are synchronized, the synchronization should be maintained at all times. Three cases may need to be specifically addressed.

The first case is related to the nature of a typical IGD, i.e. an IDG is hand-held and can be moved freely. Therefore, changes in the position of the IGD are to be monitored. The three-axis accelerometer of the IGD is used for this monitoring purpose. The IGD must be kept in a stable position when its position is synchronized to the 3DM position so that the IGD speed be zero along all three axes. Once the positions of the IGD and 3DM have been synchronized as described above, the tracking of the motion of the IGD starts and the three-axis accelerometer is used to measure the current acceleration of the IGD along the three axes $X_{IGD}$, $Y_{IGD}$, $Z_{IGD}$. From the acceleration measurements, the IGD determines its current speed and position along three axes $X_{IGD}$, $Y_{IGD}$, $Z_{IGD}$, and its position variation.

From the position variation of the IGD, three offset values $\Delta X_{offset}$, $\Delta Y_{offset}$, $\Delta Z_{offset}$ along the IGD three axes $X_{IGD}$, $Y_{IGD}$, $Z_{IGD}$, which correspond to the displacement vector for the IGD, are determined and applied to the coordinates $RPX_{IGD}$, $RPY_{IGD}$, $RPZ_{IGD}$ of the reference point RP in the internal IGD 3D coordinate system to obtain an updated reference point RP' having the coordinates $RPX_{IGD}+\Delta X_{offset}$, $RPY_{IGD}+\Delta Y_{offset}$, $RPZ_{IGD}+\Delta Z_{offset}$ in the internal IGD 3D coordinate system. The updated reference point RP' is then used to update the Rigid 3D Transformation $T_{IGD-To-IGDEarth}$ and maintain the synchronization of the positions of the IGD and 3DM while the IGD is in motion. The updated Rigid 3D Transformation $T_{IGD-To-IGDEarth}$ both transforms the $X_{IGD}$, $Y_{IGD}$, $Z_{IGD}$ axes to the $X_{IGD-Earth}$, $Y_{IGD-Earth}$, $Z_{IGD-Earth}$ axes and transform the updated reference point RP' to $O_{Earth}$.

The second case is related to the nature of a typical IGD, which is that it is hand-held and can be rotated freely. Therefore, changes in the orientation of the IGD are to be monitored. If a change in the orientation of the IGD is detected, the Rigid 3D Transformation $T_{IGD-To-IGDEarth}$ should be updated by re-measuring the directions of gravity and North magnetic pole using the IGD gravity direction measurement device and electronic compass, and then updating the Rigid 3D Transformation $T_{IGD-To-IGDEarth}$.

In addition, measurement processes generally require the transformation of the 3DM 3D Coordinate System into other 3D Coordinate Systems, typically ones created in Computer-Aided Design (CAD) software. To maintain the synchronization of the position and orientation of the IGD and the position and orientation of the 3DM, the invert of the Rigid 3D Transformation $T_{3DM-To-3DMEarth}$ should be applied to both the 3D Coordinate System $O_{Earth}$, $X_{IGD-Earth}$, $Y_{IGD-Earth}$, $Z_{IGD-Earth}$ and the 3D Coordinate System $O_{Earth}$, $X_{3DM-Earth}$, $Y_{3DM-Earth}$, $Z_{3DM-Earth}$. This operation transforms the IGD 3D Coordinate System into the internal 3DM 3D Coordinate System, while keeping the positions and orientations synchronized. Then, an operator can determine a Rigid 3D Transformation transforming the internal 3DM 3D Coordinate System into the 3D Coordinate System of a model designed in CAD (Computer-Aided Design) software. This Rigid 3D Transformation would then be applied to both IGD and 3DM 3D Coordinate Systems in order to maintain their position and orientation synchronized.

Once the position and orientation of the IGD and the position and orientation of the 3DM are synchronized, the IGD can be used to guide a measurement process by means of 3D graphics displayed on the IGD display device. The following methodology demonstrates measurement guidance by means of 3D graphics.

First, the position and orientation of the IGD and the position and orientation of the 3DM 3D Coordinate Systems are synchronized, as described above. Then, the 3DM 3D Coordinate System is usually transformed to bring it into a more useful position and orientation. For example, points are measured on a physical part or assembly, and these measured points are used to construct a transformation that transforms the 3DM 3D Coordinate System into a CAD 3D Coordinate System. Since synchronization is achieved and maintained, the IGD 3D Coordinate System is also transformed, and the IGD 3D Coordinate System will have the same position and orientation compared to the corresponding CAD 3D Coordinate System.

It then becomes possible to use the IGD display device to display 3D graphics of the CAD model and ensure that these 3D graphics have the same position and orientation as the CAD 3D Coordinate System. In the above example, 3D graphics to be displayed on the IGD are determined by geometry defined in the CAD 3D Coordinate System. In order to produce 3D graphics of this geometry and display these 3D graphics on the IGD display device, the following Rigid 3D Transformations are applied successively to this geometry: the invert of the 3DM-to-CAD Rigid 3D Transformation; $T_{3DM-To-3DMEarth}$; the invert of $T_{IGD-To-IGDEarth}$.

If the operator needs to measure a specific section of the CAD model during a measurement routine, the IGD display device may be used to display the specific section using 3D graphics. Guidance 3D graphics such as 3D geometry, 3D arrows and 3D text annotations can be used to supply information to the operator and guide the measurement process. For example, if a given target point needs to be measured, the target point and 3D arrows indicating the current distance between the 3DM and the target point along the three axes can be displayed on the IGD display device. Because the target point position on the display is close to what the operator sees on the physical part in front of his eyes, and the 3D arrows are oriented along the axes of the physical part or assembly, they help the operator reaching the target position more quickly.

Figure 6:
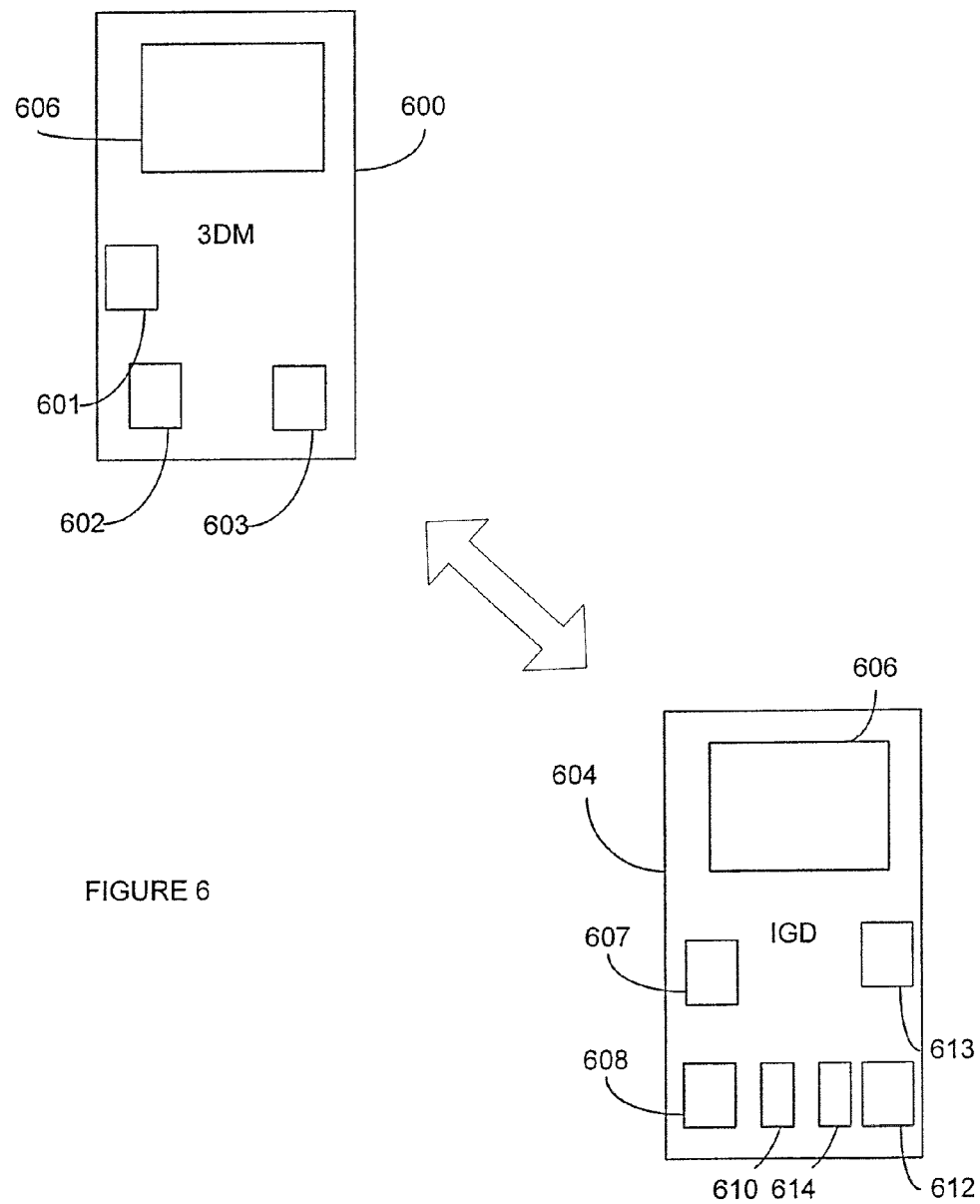
FIG. 6 is a block diagram of a system for synchronizing a 3DM and an IGD where the transformation modules are integrated onto the respective devices, in accordance with one embodiment.

FIG. 6 illustrates an embodiment for a system for synchronizing the internal coordinate systems of a 3DM 600 and an IGD 604 in order to allow measurement guidance using the IGD 604. In this embodiment, the 3DM 600 comprises a processing unit 601, a display device 606, a 3DM transformation module 602, and a coordinate measurement module 603. The 3DM coordinates measurement module 603 comprises at least one 3D measurement probe and is adapted to measure the 3D coordinates of points in the 3D space, such as the coordinates of the reference point RP. The 3DM transformation module 602 is a software product adapted to define the coordinate system $O_{Earth}$, $X_{3DM\text{-}Earth}$, $Y_{3DM\text{-}Earth}$, $Z_{3DM\text{-}Earth}$ using the direction opposite to gravity as $Z_{3DM\text{-}Earth}$ and the direction corresponding to the magnetic north pole as $Y_{3DM\text{-}Earth}$, from the perspective of the 3DM. The 3DM transformation module 602 will then compute the rigid transformation $T_{3DM\text{-}To\text{-}3DMEarth}$ to both transform the $X_{3DM}$, $Y_{3DM}$, $Z_{3DM}$ axes of the 3DM coordinate system to the $X_{3DM\text{-}Earth}$, $Y_{3DM\text{-}Earth}$, $Z_{3DM\text{-}Earth}$ axes and the reference point ($RPX_{3DM}$, $RPY_{3DM}$, $RPZ_{3DM}$) to the origin $O_{Earth}$. This rigid transformation can then be applied to the internal coordinate system of the 3DM 600.

FIG. 6 also illustrates the IGD 604 with which the 3DM 600 is being synchronized. In the embodiment illustrated, the IGD 604 also has a display device 606 and a processing unit 607. A gravity direction measurement device 608, an electronic compass 612, and a three-axis accelerometer 613 are integrated inside the IGD 604. The IGD 604 also comprises an IGD coordinates module 614 which is a software product adapted to receive the coordinates $RPX_{IGD}$, $RPY_{IGD}$, $RPZ_{IGD}$ of the reference point RP, receive the measured acceleration of the IGD along the three axes $X_{IGD}$, $Y_{IGD}$, $Z_{IGD}$ from the three-axis accelerometer 613, determine the three offset values $\Delta X_{offset}$, $\Delta Y_{offset}$, $\Delta Z_{offset}$ along the IGD three axes $X_{IGD}$, $Y_{IGD}$, $Z_{IGD}$ corresponding to the IGD position variation, and compute the updated reference point RP' having the coordinates $RPX_{IGD}+\Delta X_{offset}$, $RPY_{IGD}+\Delta Y_{offset}$, $RPZ_{IGD}+\Delta Z_{offset}$.

While in this embodiment, the coordinates of the reference point RP are entered by the user and received by the IGD coordinates module 614, the IGD coordinates module 614 may be further adapted to determine the coordinates of the reference point RP. For example, the IGD coordinates module 614 may be adapted to display on the display 606 a mark such as a circle for example, and determine the 3D coordinates of the mark in the IGD internal 3D coordinate system.

Also integrated is an IGD transformation module 610, which is a software product adapted to define the coordinate system $O_{Earth}$, $X_{IGD\text{-}Earth}$, $Y_{IGD\text{-}Earth}$, $Z_{IGD\text{-}Earth}$ using the direction opposite to gravity as $Z_{IGD\text{-}Earth}$ and the direction corresponding to the magnetic north pole as $Y_{IGD\text{-}Earth}$, from the perspective of the IGD 604. The IGD transformation module 610 receives the coordinates of the reference point from the IGD coordinate module 614, and computes and applies a rigid transformation $T_{IGD\text{-}To\text{-}IGDEarth}$ to both transform the $X_{IGD}$, $Y_{IGD}$, $Z_{IGD}$ axes of the IGD coordinate system to the $X_{IGD\text{-}Earth}$, $Y_{IGD\text{-}Earth}$, $Z_{IGD\text{-}Earth}$ axes and the reference point $RPX_{IGD}$, $RPY_{IGD}$, $RPZ_{IGD}$ to $O_{Earth}$. The IGD transformation module 610 also receives the coordinates of the updated reference point RP' from the IGD coordinate module 614, and computes and applies an updated rigid transformation $T_{IGD\text{-}To\text{-}IGDEarth}$ to both transform the $X_{IGD}$, $Y_{IGD}$, $Z_{IGD}$ axes of the IGD coordinate system to the $X_{IGD\text{-}Earth}$, $Y_{IGD\text{-}Earth}$, $Z_{IGD\text{-}Earth}$ axes and the updated reference point RP' to the origin $O_{Earth}$ in order to maintain the position and orientation synchronization between the IGD and the 3DM while the IGD is moving.

In the embodiment of FIG. 6, a specially adapted 3DM 600 and a specially adapted IGD 604 are sufficient to perform the above-described synchronization and allow the IGD 604 to be used to display 3D graphics in a known position and orientation. The IGD transformation module 610, the 3DM transformation module 602, and the IGD coordinates module 614 can be downloaded onto the respective devices via the Internet or transferred from a storage medium such as a USB key, a scandisk, or any other type of memory device. The transfer of the software program onto the devices may be done in a wireless manner or a connected manner using one or more wires or cables. The modules 602, 610, 614 may also be provided on the devices at the time of fabrication or manufacturing. The IGD 604 and the 3DM 600 may also be in communication together to transfer 3D images from one device to the other. This communication may be done in a wireless manner, such as Radio Frequency, WiFi, infrared, microwaves, etc. This communication may also be done in a connected manner using one or more wires or cables.

Figure 7:
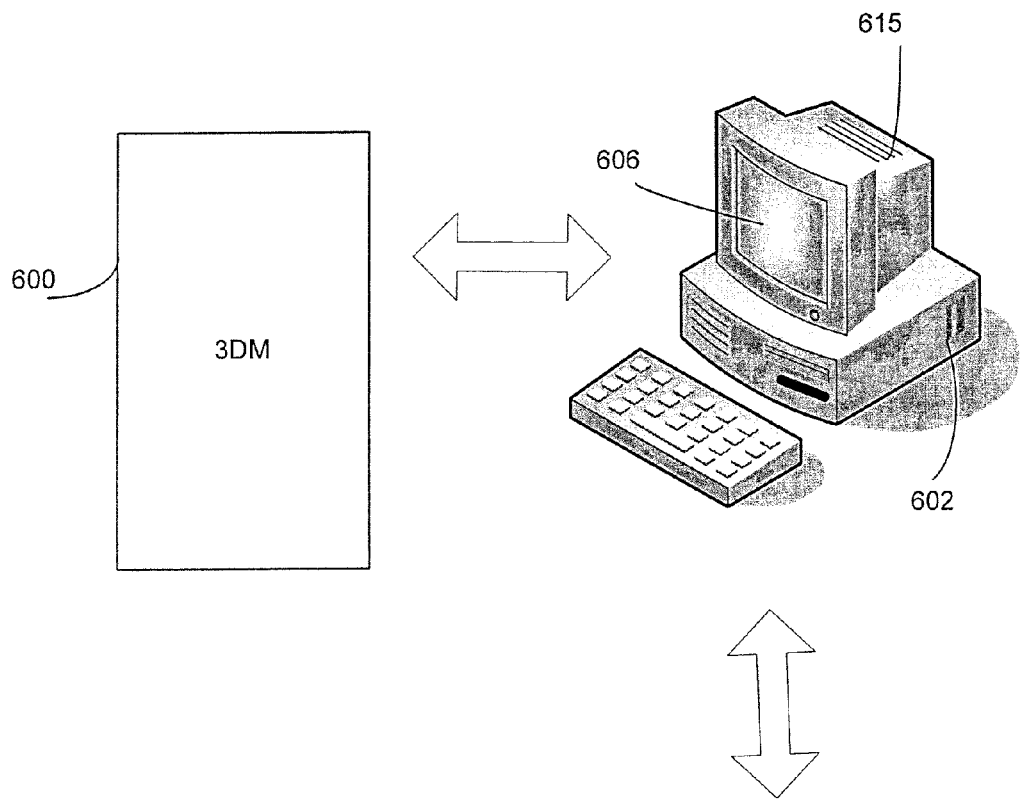
FIG. 7 is a block diagram of a system for synchronizing a 3DM and an IGD where a separate computing device is used for one of the transformation modules, in accordance with one embodiment.
Figure 7:
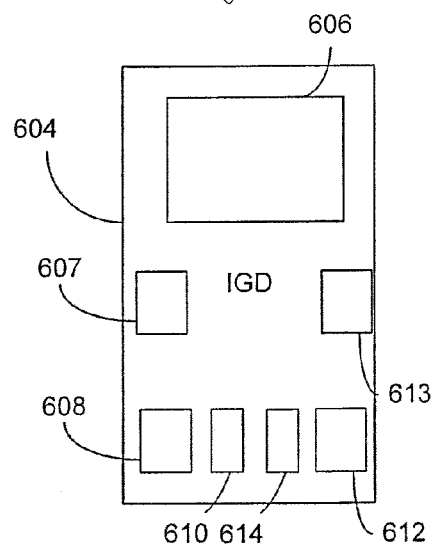

FIG. 7 illustrates a second embodiment of the system for synchronizing the IGD 604 and the 3DM 600. In this case, one of the transformation modules, namely the 3DM transformation module 602 is on a computing device 615 separate from the 3DM 600. Alternatively, the transformation module on the computing device 615 may comprise the IGD transformation module 610 while the 3DM transformation module 602 is integrated in the 3DM 600, as per FIG. 6. It should be understood that the updating of the reference point RP while the IGD 604 is moving may be performed by the computing device 615. In this case, the computing device 615 receives the measured acceleration of the IGD along the three axes $X_{IGD}$, $Y_{IGD}$, $Z_{IGD}$ from the IGD 604, determines the three offset values $\Delta X_{offset}$, $\Delta Y_{offset}$, $\Delta Z_{offset}$, and computes the updated reference point RP' having the coordinates $RPX_{IGD}+\Delta X_{offset}$, $RPY_{IGD}+\Delta Y_{offset}$, $RPZ_{IGD}+\Delta Z_{offset}$.

In this embodiment, the computing device 615 has a display device 606. The computing device 615 may be a Personal Computer (PC), a laptop, a Personal Digital Assistant (PDA), or any other programmable machine that can store, retrieve, and process data and therefore includes at least one Central Processing Unit (CPU) that performs most calculations and includes a main memory, a control unit, and an arithmetic logic unit. Communications, wireless or connected, may occur between the 3DM 600 and the computing device 615, and between the computing device 615 and the IGD 604.

Figure 8:
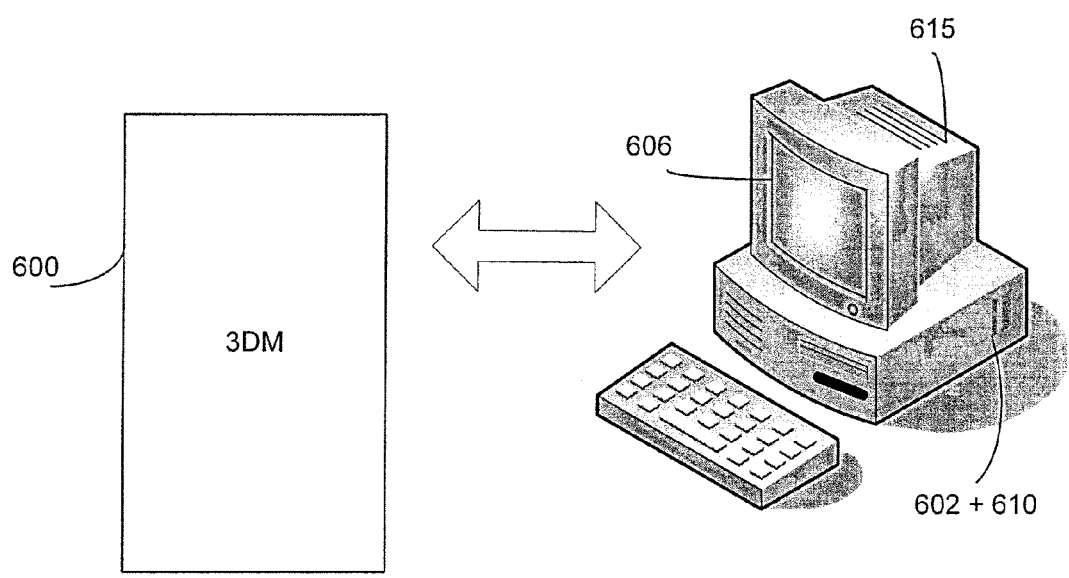
FIG. 8 is a block diagram of a system for synchronizing a 3DM and an IGD where a separate computing device is used for both of the transformation modules, in accordance with one embodiment.
Figure 8:
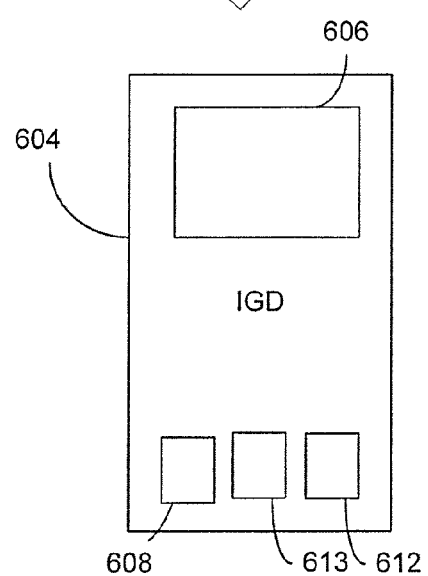

FIG. 8 illustrates a third embodiment of the system for synchronizing the IGD 604 and the 3DM 600. In this case, both of the transformation modules 602 and 610 are present on the separate computing device 615. It should be understood that the computing device 615 may be made up of one or more computers, or a network of computers, and is adapted to be in communication with the IGD 604 and the 3DM 600.

In one embodiment, the coordinates of the reference point RP expressed in the IGD internal coordinate system are input in the computing device 615. In another embodiment, the computing device is adapted to receive the coordinates of the reference point RP expressed in the IGD internal 3D coordinate system from the IGD 604 which may be adapted to determine the coordinates of a reference mark displayed on the display 606, as described above.

Other devices, besides the iPhone™ may be used as an IGD. For example, the iPod Touch™ and the Nexus One™ also include all of the elements of an IGD. Any devices which have a processing unit, a display device, a gravity direction measurement device, an electronic compass, and a three-axis accelerometer may be used. Examples of 3DM devices are the FaroArm™, the Romer Absolute Arm, and the Leica Absolute Tracker™.

It should be understood that the rigid transformations described above may be performed via a single matrix which simultaneously transform the axes and the origin or via at least two matrices which successively transform the axes and the origin. For example, the rigid transformation $T_{IGD-To-IGDEarth}$ may be performed by applying a single matrix which simultaneously transforms the axes $X_{IGD}$, $Y_{IGD}$, $Z_{IGD}$ to the axes $X_{IGD-Earth}$, $Y_{IGD-Earth}$, $Z_{IGD-Earth}$ and the reference point RP to the origin $O_{Earth}$, i.e. simultaneously aligns the axes $X_{IGD}$, $Y_{IGD}$, $Z_{IGD}$ with the axes $X_{IGD-Earth}$, $Y_{IGD-Earth}$, $Z_{IGD-Earth}$, respectively, and translate the reference point RP to the origin $O_{Earth}$. Alternatively, the rigid transformation $T_{IGD-To-IGDEarth}$ may be performed by applying a two matrices, i.e. one matrix which transforms the axes $X_{IGD}$, $Y_{IGD}$, $Z_{IGD}$ to the axes $X_{IGD-Earth}$, $Y_{IGD-Earth}$, $Z_{IGD-Earth}$ and another matrix which transforms the reference point RP to the origin $O_{Earth}$.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

We claim:

1. A method for synchronizing a three-dimensional measurement device (3DM) having a 3DM internal 3D coordinate system $O_{3DM}$, $X_{3DM}$, $Y_{3DM}$, and $Z_{3DM}$, with an intelligent guidance device (IGD) that is physically separate from the 3DM, the IGD having a display device, a gravity direction measurement device, an electronic compass, and an IGD internal 3D coordinate system $O_{IGD}$, $X_{IGD}$, $Y_{IGD}$, $Z_{IGD}$, the method comprising:
   use of a processor for
   determining coordinates $RPX_{IGD}$, $RPY_{IGD}$, $RPZ_{IGD}$ of a reference point RP in the IGD internal 3D coordinate system $O_{IGD}$, $X_{IGD}$, $Y_{IGD}$, $Z_{IGD}$;
   defining a coordinate system $O_{Earth}$, $X_{IGD-Earth}$, $Y_{IGD-Earth}$, $Z_{IGD-Earth}$ using a direction opposite to gravity as $Z_{IGD-Earth}$ and a direction corresponding to a magnetic north pole as $Y_{IGD-Earth}$, from a perspective of the IGD;
   computing and applying a rigid transformation $T_{IGD-To-IGDEarth}$ to transform axes $X_{IGD}$, $Y_{IGD}$, $Z_{IGD}$ of the IGD internal 3D coordinate system to $X_{IGD-Earth}$, $Y_{IGD-Earth}$, $Z_{IGD-Earth}$ and the reference point RP having the coordinates $RPX_{IGD}$, $RPY_{IGD}$, $RPZ_{IGD}$ to $O_{Earth}$;
   determining coordinates $RPX_{3DM}$, $RPY_{3DM}$, $RPZ_{3DM}$ of the reference point RP in the 3DM internal 3D coordinate system $O_{3DM}$, $X_{3DM}$, $Y_{3DM}$, and $Z_{3DM}$;
   defining a coordinate system $O_{Earth}$, $X_{3DM-Earth}$, $Y_{3DM-Earth}$, $Z_{3DM-Earth}$ using a direction opposite to gravity as $Z_{3DM-Earth}$ and the direction corresponding to the magnetic north pole as $Y_{3DM-Earth}$, from a perspective of the 3DM; and
   computing and applying a rigid transformation $T_{3DM-To-3DMEarth}$ to transform axes $X_{3DM}$, $Y_{3DM}$, and $Z_{3DM}$ of the 3DM internal 3D coordinate system to axes $X_{3DM-Earth}$, $Y_{3DM-Earth}$, $Z_{3DM-Earth}$ and the reference point RP having the coordinates $RPX_{3DM}$, $RPY_{3DM}$, $RPZ_{3DM}$ to $O_{Earth}$.

2. The method of claim 1, wherein said determining coordinates $RPX_{3DM}$, $RPY_{3DM}$, $RPZ_{3DM}$ comprises measuring the coordinates $RPX_{3DM}$, $RPY_{3DM}$, $RPZ_{3DM}$ using the 3DM.

3. The method of claim 1, wherein said determining coordinates $RPX_{IGD}$, $RPY_{IGD}$, $RPZ_{IGD}$ comprises:
   displaying a reference mark on the display device of the IGD; and
   determining the coordinates $RPX_{IGD}$, $RPY_{IGD}$, $RPZ_{IGD}$ of the reference mark in the IGD internal 3D coordinate system.

4. The method of claim 3, wherein said determining the coordinates $RPX_{3DM}$, $RPY_{3DM}$, $RPZ_{3DM}$ comprising measuring the coordinates $RPX_{3DM}$, $RPY_{3DM}$, $RPZ_{3DM}$ of the reference mark displayed on the display of the IGD using the 3DM.

5. The method of claim 1, further comprising:
   determining a variation of position for the IGD in the IGD internal 3D coordinate system $O_{IGD}$, $X_{IGD}$, $Y_{IGD}$, $Z_{IGD}$;
   applying the variation of position to the reference point, thereby obtaining an updated reference point; and
   computing and applying an updated rigid transformation $T_{IGD-To-IGDEarth}$ to transform the axes $X_{IGD}$, $Y_{IGD}$, $Z_{IGD}$ to the axes $X_{IGD-Earth}$, $Y_{IGD-Earth}$, $Z_{IGD-Earth}$ and the updated reference point to $O_{Earth}$.

6. The method of claim 5, wherein said determining a variation of position comprises measuring an acceleration of the IGD along the axes $X_{IGD}$, $Y_{IGD}$, $Z_{IGD}$ using a three-axis accelerometer comprised in the IGD and calculating the variation of position for the IGD in the IGD internal 3D coordinate system from the measured acceleration.

7. The method of claim 1, wherein defining a coordinate system $O_{Earth}$, $X_{IGD-Earth}$, $Y_{IGD-Earth}$, $Z_{IGD-Earth}$ comprises:
   measuring a direction of gravity using the gravity direction measurement device and defining a vector $Z_{IGD-Earth}$ as opposite to the direction of gravity;
   measuring a direction of North magnetic pole using the electronic compass and defining a vector $Y_{IGD-Earth}$ pointing in the North magnetic pole direction; and
   computing a vector product of $Y_{IGD-Earth}$ and $Z_{IGD-Earth}$ defining vector $X_{IGD-Earth}$.

8. The method of claim 1, wherein defining a coordinate system $O_{Earth}$, $X_{3DM-Earth}$, $Y_{3DM-Earth}$, $Z_{3DM-Earth}$ comprises:
   measuring a direction of gravity using a second gravity direction measurement device integrated in the 3DM and defining a vector $Z_{3DM-Earth}$ as opposite to the direction of gravity;
   measuring a direction of North magnetic pole using a second electronic compass integrated in the 3DM and defining a vector $Y_{3DM-Earth}$ pointing in the North magnetic pole direction; and
   computing a vector product of $Y_{3DM-Earth}$ and $Z_{3DM-Earth}$ defining vector $X_{3DM-Earth}$.

9. The method of claim 1, further comprising defining a plane formed by $Z_{IGD-Earth}$ and $Y_{IGD-Earth}$, and rotating one of $Y_{IGD-Earth}$ and $Z_{IGD-Earth}$ to make $Z_{IGD-Earth}$ and $Y_{IGD-Earth}$ perpendicular to each other.

10. The method of claim 1, further comprising defining a plane formed by $Z_{3DM\text{-}Earth}$ and $Y_{3DM\text{-}Earth}$, and rotating one of $Y_{3DM\text{-}Earth}$ and $Z_{3DM\text{-}Earth}$ to make $Z_{3DM\text{-}Earth}$ and $Y_{3DM\text{-}Earth}$ perpendicular to each other.

11. The method of claim 1, further comprising:
monitoring a change in orientation of the IGD; and
when a change is detected, updating the rigid transformation $T_{IGD\text{-}To\text{-}IGDEarth}$ by re-measuring gravity and north magnetic pole and re-applying the rigid transformation.

12. A system for synchronizing a three-dimensional measurement device (3DM) having a 3DM internal 3D coordinate system $O_{3DM}$, $X_{3DM}$, $Y_{3DM}$, and $Z_{3DM}$, with an intelligent guidance device (IGD) that is physically separate from the 3DM, the IGD having a display device, a gravity direction measurement device, an electronic compass, and an IGD internal 3D coordinate system $O_{IGD}$, $X_{IGD}$, $Y_{IGD}$, $Z_{IGD}$, the system comprising:
at least one memory;
at least one processor;
an IGD transformation module stored on the at least one memory and operatively connected to the IGD, the IGD transformation module executable by the at least one processor and having program code that, when executed, defines a coordinate system $O_{Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to a magnetic north pole as $Y_{IGD\text{-}Earth}$, from a perspective of the IGD, and computes and applies a rigid transformation $T_{IGD\text{-}To\text{-}IGDEarth}$ to transform axes $X_{IGD}$, $Y_{IGD}$, $Z_{IGD}$ of the IGD internal 3D coordinate system to axes $X_{IGD\text{-}Earth}$, $Y_{IGD\text{-}Earth}$, $Z_{IGD\text{-}Earth}$ and a reference point RP having coordinates $RPX_{IGD}$, $RPY_{IGD}$, $RPZ_{IGD}$ in the IGD internal 3D coordinate system to $O_{Earth}$; and
a 3DM transformation module stored on the at least one memory and operatively connected to the 3DM, the 3DM transformation module executable by the at least one processor and having program code that, when executed, defines a coordinate system $O_{Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM, computes and applies a rigid transformation $T_{3DM\text{-}To\text{-}3DMEarth}$ to transform axes $X_{3DM}$, $Y_{3DM}$, and $Z_{3DM}$ of the 3DM internal 3D coordinate system to axes $X_{3DM\text{-}Earth}$, $Y_{3DM\text{-}Earth}$, $Z_{3DM\text{-}Earth}$ and the reference point RP having coordinates $RPX_{3DM}$, $RPY_{3DM}$, $RPZ_{3DM}$ in the 3DM internal 3D coordinate system to $O_{Earth}$.

13. The system of claim 12, wherein the reference point RP is a reference mark to be displayed on the display device of the IGD, the IGD is adapted to determine the coordinates $RPX_{IGD}$, $RPY_{IGD}$, $RPZ_{IGD}$ of the reference mark, and the 3DM is adapted to measure the coordinates of the reference $RPX_{3DM}$, $RPY_{3DM}$, $RPZ_{3DM}$ mark displayed on the display device of the IGD.

14. The system of claim 12, further comprising an IGD coordinate module adapted to determine a variation of position for the IGD in the IGD internal 3D coordinate system $O_{IGD}$, $X_{IGD}$, $Y_{IGD}$, $Z_{IGD}$, applying the variation of position to the reference point RP to obtain an updated reference point, and compute and apply an updated rigid transformation $T_{IGD\text{-}To\text{-}IGDEarth}$ to transform the axes $X_{IGD}$, $Y_{IGD}$, $Z_{IGD}$ to the axes $X_{IGD\text{-}Earth}$, $Y_{IGD\text{-}Earth}$, $Z_{IGD\text{-}Earth}$ and the updated reference point to $O_{Earth}$.

15. The system of claim 14, wherein the IGD further comprises a three-axis accelerometer for measuring an acceleration of the IGD in the IGD internal 3D coordinate system and the IGD coordinate module is further adapted to calculate the variation of position for the IGD in the IGD internal 3D coordinate system from the measured acceleration.

16. The system of claim 12, wherein at least one the 3DM transformation module and the IGD transformation module is integrated inside the 3DM and the IGD, respectively.

17. An intelligent guidance device (IGD) having an IGD internal 3D coordinate system $O_{IGD}$, $X_{IGD}$, $Y_{IGD}$, $Z_{IGD}$, the device comprising:
a gravity direction measurement device;
an electronic compass;
a memory;
a processor;
an IGD transformation module stored on the memory and operatively connected to the IGD, the IGD transformation module executable by the processor and having program code that, when executed. defines a coordinate system $O_{Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to a magnetic north pole as $Y_{IGD\text{-}Earth}$, and computes and applies a rigid transformation $T_{IGD\text{-}To\text{-}IGDEarth}$ to transform axes $X_{IGD}$, $Y_{IGD}$, $Z_{IGD}$ of the IGD internal 3D coordinate system to axes $X_{IGD\text{-}Earth}$, $Y_{IGD\text{-}Earth}$, $Z_{IGD\text{-}Earth}$ and a reference point RP having coordinates $RPX_{IGD}$, $RPY_{IGD}$, $RPZ_{IGD}$ in the IGD internal 3D coordinate system to $O_{Earth}$; and
a display device for displaying 3D graphics in a 3D coordinate system synchronized with a 3D coordinate system of a three-dimensional measurement device (3DM) that is physically separate from the intelligent guidance device.

18. The intelligent guidance device of claim 17, further comprising a three-axis accelerometer for measuring an acceleration of the IGD in the IGD internal 3D coordinate system and an IGD coordinate module adapted to calculate a variation of position for the IGD in the IGD internal 3D coordinate system from the measured acceleration, apply the variation of position to the reference point RP to obtain an updated reference point, and compute and apply an updated rigid transformation $T_{IGD\text{-}To\text{-}IGDEarth}$ to transform the axes $X_{IGD}$, $Y_{IGD}$, $Z_{IGD}$ to the axes $X_{IGD\text{-}Earth}$, $Y_{IGD\text{-}Earth}$, $Z_{IGD\text{-}Earth}$ and the updated reference point to $O_{Earth}$.

19. A non-transitory computer readable memory having recorded thereon statements and instructions for execution by a computer to carry out a method for synchronizing a three-dimensional measurement device (3DM) having a 3DM internal 3D coordinate system $O_{3DM}$, $X_{3DM}$, $Y_{3DM}$, and $Z_{3DM}$, with an intelligent guidance device (IGD) that is physically separate from the 3DM, the IGD having a display device, a gravity direction measurement device, an electronic compass, and an IGD internal 3D coordinate system $O_{IGD}$, $X_{IGD}$, $Y_{IGD}$, $Z_{IGD}$, the statements and instructions being directed to:
defining a coordinate system $O_{Earth}$, $X_{IGD\text{-}Earth}$, $Y_{IGD\text{-}Earth}$, $Z_{IGD\text{-}Earth}$ using a direction opposite to gravity as $Z_{IGD\text{-}Earth}$ and a direction corresponding to a magnetic north pole as $Y_{IGD\text{-}Earth}$, from a perspective of the IGD;
computing and applying a rigid transformation $T_{IGD\text{-}To\text{-}IGDEarth}$ to transform axes $X_{IGD}$, $Y_{IGD}$, $Z_{IGD}$ of the IGD internal 3D coordinate system to axes $X_{IGD\text{-}Earth}$, $Y_{IGD\text{-}Earth}$, $Z_{IGD\text{-}Earth}$ and a reference point RP having coordinates $RPX_{IGD}$, $RPY_{IGD}$, $RPZ_{IGD}$ in the IGD internal 3D coordinate system to $O_{Earth}$;
defining a coordinate system $O_{Earth}$, $X_{3DM\text{-}Earth}$, $Y_{3DM\text{-}Earth}$, $Z_{3DM\text{-}Earth}$ using a direction opposite to gravity as $Z_{3DM\text{-}Earth}$ and the direction corresponding to the magnetic north pole as $Y_{3DM\text{-}Earth}$, from a perspective of the 3DM; and computing and applying a rigid transformation $T_{3DM\text{-}To\text{-}3DMEarth}$ to transform axes $X_{3DM}$, $Y_{3DM}$, and $Z_{3DM}$ of the 3DM internal 3D coordinate system to the axes $X_{3DM\text{-}Earth}$, $Y_{3DM\text{-}Earth}$, $Z_{3DM\text{-}Earth}$ and the reference point RP having coordinates $RPX_{3DM}$, $RPY_{3DM}$, $RPZ_{3DM}$ in the 3DM internal 3D coordinate system to $O_{Earth}$.

20. The non-transitory computer readable memory of claim 19, wherein the statements and instructions are further being directed to:

determining an acceleration of the IGD in the IGD internal 3D coordinate system using a three-axis accelerometer integrated in the IGD;

calculating a variation of position for the IGD in the IGD internal 3D coordinate system from the acceleration;

applying the variation of position to the reference point RP to obtain an updated reference point; and computing and applying an updated rigid transformation $T_{IGD\text{-}To\text{-}IGDEarth}$ to transform the axes $X_{IGD}$, $Y_{IGD}$, $Z_{IGD}$ to the axes $X_{IGD\text{-}Earth}$, $Y_{IGD\text{-}Earth}$, $Z_{IGD\text{-}Earth}$ and the updated reference point to $O_{Earth}$.

* * * * *